Feb. 2, 1932.    M. S. SUTTON    1,843,846
VEHICLE WHEEL CONSTRUCTION
Filed July 10, 1931    2 Sheets-Sheet 1
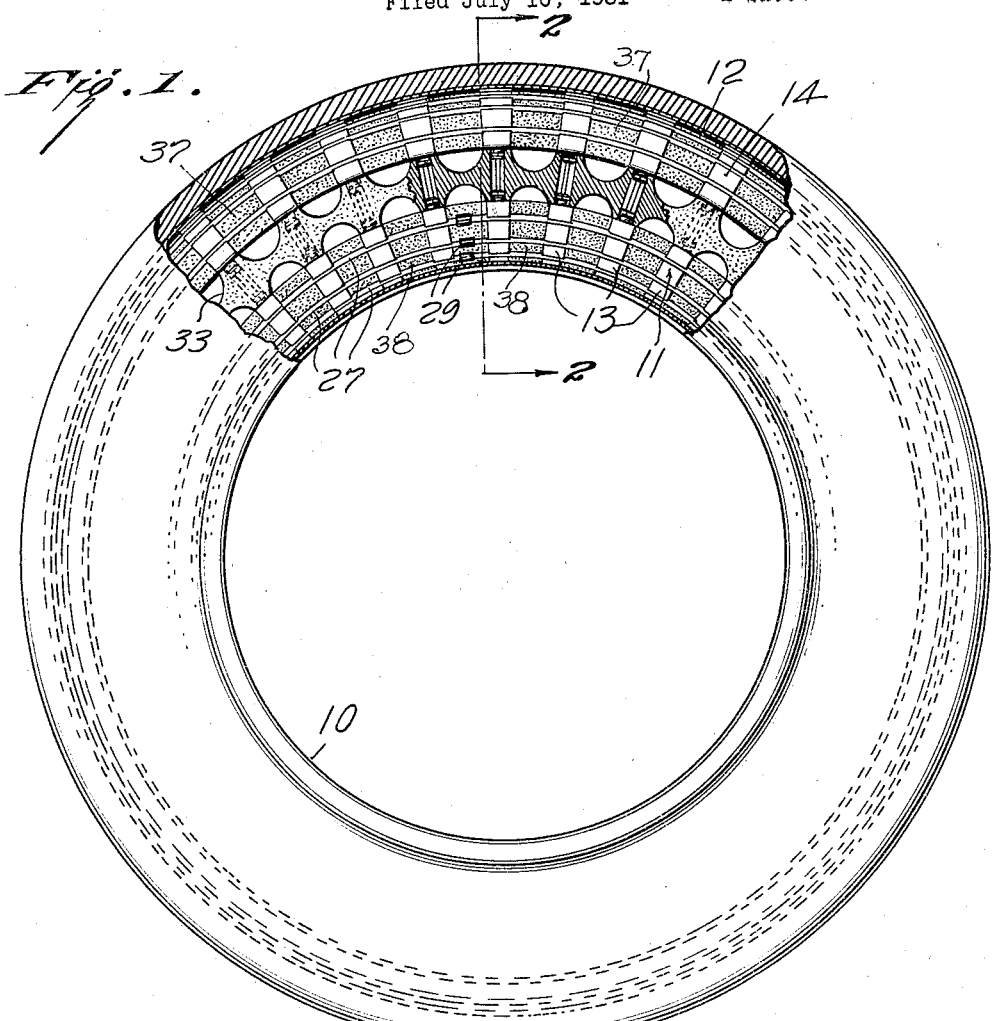
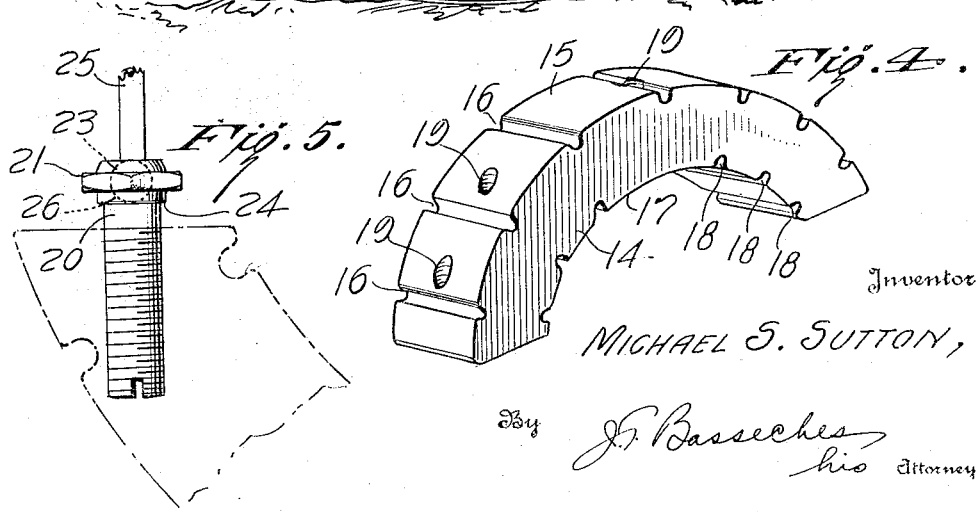
Inventor
MICHAEL S. SUTTON,
By J. F. Basseches
his Attorney

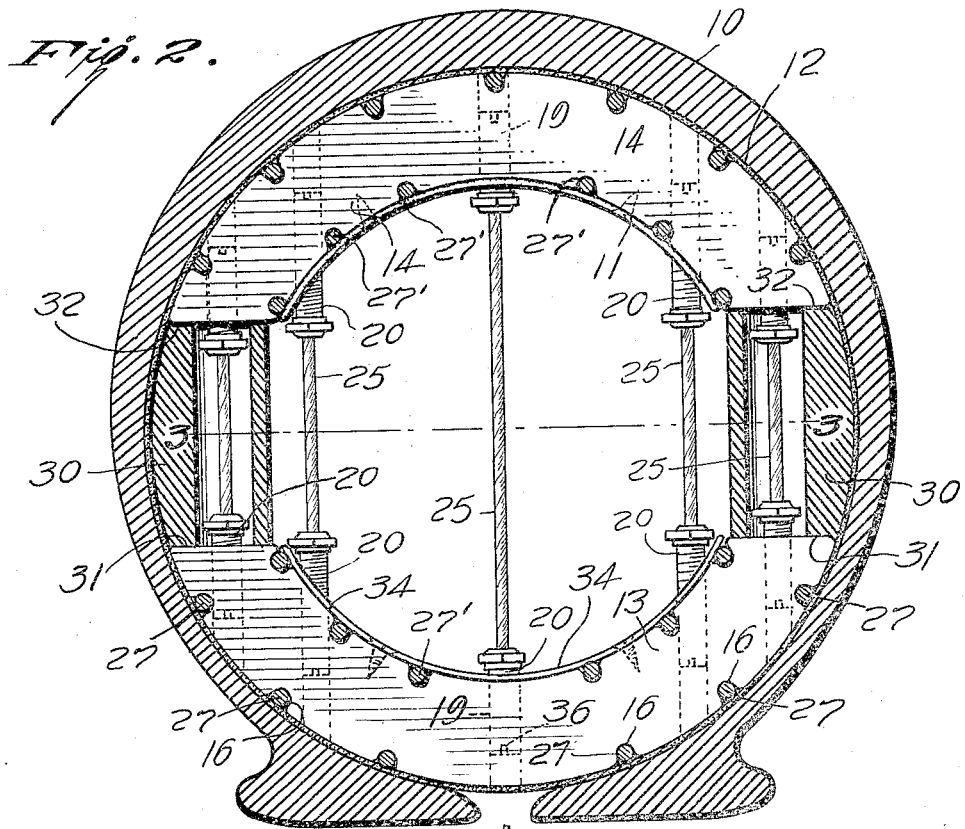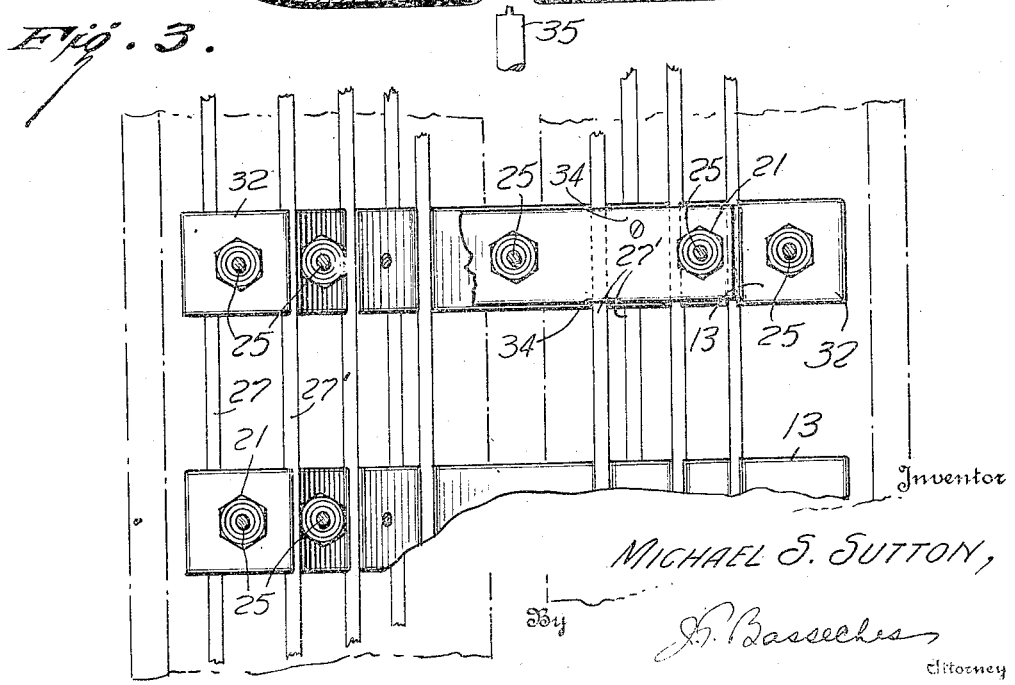

Patented Feb. 2, 1932

1,843,846

UNITED STATES PATENT OFFICE

MICHAEL S. SUTTON, OF BROOKLYN, NEW YORK

VEHICLE WHEEL CONSTRUCTION

Application filed July 10, 1931. Serial No. 549,944.

This invention relates to resilient wheels or tire construction.

It is an object of my invention to provide a resilient wheel construction for vehicles in the nature of a tire or a construction which may be associated with the present day detachable shoe or casing of a pneumatic tire to support a vehicle with the resiliency characteristics of a pneumatic tire, but free from the burden of using a sealed air chamber.

It is contemplated by my invention to provide a tire or tire accessory which will impart to wheels for vehicles proper resiliency against shock of vibration in running or when encountering the starting or braking torque. It is contemplated by my invention to provide a tire construction in the nature of an insert similar to an inner tube, which may be positioned in the casing or shoe of present removable or detachable tires, as a substitute for the deflatable inner tubes now in use.

It is further contemplated by my invention to provide for a tire shoe casing, an insert which will distend the casing to its full predetermined configuration, and which will, with requisite resiliency, sustain a load thereon when used upon a wheel supporting a vehicle, without impairment of the resilient characteristics of the component parts for a considerable period of time.

My invention contemplates a tire casing filler member which is free from the objectionable use of pneumatic casings and metallic resilient members, including the resilient features of a pneumatic tire construction, as well as non-pneumatic parts, without the loss of life due to vibration entailed in using metallic spring members, characteristic of prior efforts to substitute spring wheels or similar constructions for the pneumatic tire.

Still further objects of my invention reside in the provision of a tire or wheel construction which includes the resilient support of a shoe or tire casing by a skeleton frame made of flexible rope or similar tie members, which will resiliently support and distend the walls of the tire to the proper configuration in connection with all stresses, strains and the shock of use encountered by wheels of vehicles, free from the internal fatigue characteristic of using the resiliency of rigid, springy bodies.

To attain these objects and such further objects as may appear herein or be hereinafter pointed out, I make reference to the accompanying drawings, forming a part hereof, in which—

Figure 1 is a fragmentary side elevation of my invention;

Figure 2 is a section taken on the line 2—2 of Figure 1;

Figure 3 is a fragmentary section taken on the line 3—3 of Figure 2;

Figure 4 is a perspective view of an enlarged detail;

Figure 5 is an enlarged fragmentary view of another detail.

Making reference to the drawings, it is contemplated by me to utilize present day casings or tires 10, made of combined rubber and fabric or cord construction, of the well-known clincher or straight-walled types, capable of being held upon a wheel by the innumerable means now used for removable mountings.

For association with this type of casing, I provide an inner skeleton filler, generally referred to at 11. This skeleton filler may be formed as a unit and itself encased within fabric or wrapping 12. This wrapping may be a sheathing of rubber or a wrapping of canvas, duck or similar fabric. The skeleton comprises a plurality of radially disposed inner stays 13, and outer stays 14, substantially semi-circular in cross section.

It will be understood that the inner stays may be smaller than the outer stays in respect to the parti-circular dimension to each side of the axial line through the center of the tire, for purposes which will appear more clearly as this description proceeds.

An individual stay of the character referred to, as illustrated in Figure 4, may be made of wood or metal, preferably light weight metal, such as duralumin or aluminum alloys, to give desirable lightness of weight; or compositions or combinations of metal and wood may be used, where strength and lightness of weight are found to be obtained by such combinations.

Each stay is formed, at its circular surface 15, with a slot 16. These slots are in alignment with concentric circles drawn through the axial line passing through the hub of the wheel.

In the preferred embodiment of my invention, the inner area 17 may also be provided with slots 18, corresponding in position to concentric circles whose center is the same as that formed by the slots 16. Sets of stays 13 and 14 are arranged radially and each is provided with radial orifices 19. The illustration shows five in number, one disposed at the center of the stays and two nearer the edges. These orifices 19 are internally screw threaded and in a transverse plane lie parallel to each other, as more clearly apparent by viewing Figure 2.

Fitting within the orifices 19, there are provided the screw elements 20, each having at its edge 21 a cap 22, provided with a constricted aperture 23, and a ball joint bearing 24. The cap 22 is adapted to receive a cable shank 25 through the aperture 23. The cap has an enlarged or ball-shaped head 26, for reception within the ball joint bearing 24, previously described. It will be understood that the cap 22 may be screw threaded to the screw portion 20. Assembly may be effected by slipping the cap 22 over the cable 25 and then providing the ball 26 by a deforming process.

The member 25 has been described as a cable but it is understood that this may be rope, chain or similar flexible members, although wire rope is preferred.

The cables 25 are provided in varying lengths, corresponding approximately to the length of the cords at each of the points of the orifices 19. The central cable, however, with its screw members 20 affixed at the opposite ends, correspond substantially to the length of the diameter through the tire section as will be readily understood.

For assembly of the parts, the cables 25, with their screw members 20 attached thereto, are screw threaded within the respective orifices 19, to join the stays 13 and 14 into a section substantially circular at its exterior. The length of the cables 25 are adjusted to space the parts 13 and 14 into this general shape.

There are then provided as many of these assemblies just described, comprising connected stays 13 and 14, as will fit about the periphery of the tire at spaced points, radially positioned so that they are preferably positioned about one and one-half inches at the extreme peripheral edge corresponding to the inner wall of the casing. For this purpose, also, the width of the stays 14 may be somewhat greater than the width of the inner stays 13. When the proper number of assembled stays just described have been provided, they are assembled upon a collapsible form corresponding substantially to the wheel felly diameter. When so positioned, the stays are then connected by a number of cables 27, concentrically arranged, with the axes passing through the hub and fitting within the slots 16 of the stays 13 and 14, respectively. The slots 16 are so formed that the cables 27 are wedged thereinto. Where the stays 13 and 14 are made of metal and the cables of wire rope, affixation may be effected by spot welding. Otherwise suitable fastening means, such as clips (not shown) may be provided.

The proper length of cable 27 is adjusted by means of turn buckles 29, provided at convenient points. These members also permit of sufficient release necessary for permitting facile insertion of the assembly within a casing or shoe 10, as will be readily understood.

Under certain conditions, particularly where a rather large diameter tire is desired to be constructed, the stays 13 and 14 may be spaced from each other against a resilient block 30, disposed between the edges 31 and 32 of the stays 13 and 14, respectively. The blocks may be made of resilient rubber with an orifice therethrough to accommodate the cable 25, positioned at this point. The blocks 30 may be connected by a webbing 33, if desired, to hold the same in relation to each other resiliently, and for facilitating the assembly between the edges 31 and 32 of the stays 13 and 14, respectively.

Where additional resilient rigidity is desired, with or without the resilient blocks 30, previously described, I may dispose at the inner circular surface 17, cables 27', fitted within the slots 18 of the respective stays 13 and 14. A strip 34 serves to wedge the cables 27' into position and hold the same against displacement from the slots 18.

Where the inner series of cables 27' is used, I may omit the blocks 30. However, both series of cables 27 and 27' may be used in conjunction with the resilient blocks 30.

The skeleton filler as described is then preferably encased within the wrapper 12, previously referred to, and cemented to the peripheral surface of the entire assembly. At one point in the wrapping 12, the turn buckles 29 and orifices 19 are made accessible to a special tool. The filler assembly is formed so as to be slightly larger than the interior diameter of the casing and in this condition is inserted within the shoe or tire casing. Preferably, the casing is then cemented in position and where this means of attachment is utilized, the blocks 30 may be totally eliminated. When so positioned by means of the adjustable element, in the form of a turn buckle 29, the cables 27 or 27', where these are used, are adjusted to the proper peripheral length. I may additionally, also, accomplish the proper adjustment, particularly where the block 30 is spaced between the edges 31 and 32, by tensioning the screws 20 by a key or screw driver 35, and for this purpose, the screws 20 are provided with a key slot 36. Tensioning of the screw 20, particularly at the extreme peripheral edge, as shown in Figure 2, will serve to increase the interior diameter to facilitate positioning of the filler within the casing and the assembly of the filler and casing upon the wheel felly or removable rim of the wheel, if this is used.

For greater resiliency, where this is found desirable, the blocks 30 and the connecting webbing 33 may be entirely eliminated. Under such conditions of construction I may interpose between each of the stays 13 and 14 resilient blocks 37 and 38 made of rubber, preferably of soft and resilient rubber. These blocks 37 and 38 are molded into shape corresponding substantially to the stays 13 and 14 and are therefore not more specifically illustrated. It will be understood that in assembling my device, particularly the inner frame, assembly of the stays 13 and 14, and the blocks 37 and 38, are made before addition of the cables 27 or 27'.

It will further be understood that where I use the blocks 37 and 38, the inner cables 27' may be omitted, as well as the blocks 30 and the connecting webbing 33.

Where it is found desirable to include the blocks 30, 37 and 38 and these members are all formed of the same character of resilient rubber or similar material, an integral construction may be made from these sections, and to thereby facilitate the assembly of these parts.

It will be further understood that the preferred construction for maximum resiliency, however, includes the elimination of the blocks 30 and 38, when under such conditions it is found desirable to include the inner cables 27', though not necessarily so.

It will be understood that this key, under these conditions, will pass through a suitable orifice provided in the wheel felly and removable rim of the wheel, where this is used.

It will thus be observed that I have provided a tire casing filler or tire construction for wheels which avoids the use of pneumatic inner tubes or the use of solid rubber and such metallic resilient parts known to have been used in the prior art, which readily lose their elasticity and resiliency due to the vibration encountered in use, tending to crystallize metallic parts.

The suspension of the stays by resilient ropes, cables or chains, which may constitute my members 25, as well as the cables 27 and 27', cooperate with the casing or tire 10 to give proper resiliency to the normal stresses, strains and torque encountered in use by an ordinary wheel.

The advantages reside in the obvious elimination of the troublesome pneumatic casing or inner tube and the utilization of the resiliency of the parts by submitting any vibration, shock or load to the resiliency of tension of the cables rather than to the stiffness of springy members and the compression incident to the use thereof.

Having thus described my invention and illustrated its use, what I claim as new and desire to secure by Letters Patent, is—

1. In a tire construction, a filler member therefor, stay members substantially radially disposed, held in predetermined radial location by concentrically positioned ropes or cables, said stays being rigid and substantially semi-circular in cross section and spaced from each other, and a resilient block for spacing said stays from each other.

2. In a tire construction, a filler member therefor, stay members substantially radially disposed, means for holding said stay members radially disposed in predetermined radial location including concentrically positioned ropes or cables attached to said stay members, and transverse ropes or cables for holding said stays in predetermined spaced relationship.

3. In a wheel construction, a shoe or casing of combined rubber and fabric, a skeleton filler therefor comprising radially located, substantially semi-circular stays mounted and held apart in spaced relationship, said mounting means including concentrically positioned ropes or cables, tie members for holding said stay members in predetermined circular contour, said tie members having adjustable connection to said stays, and an enveloping casing for said filler, said filler being cemented to said tire casing.

4. In a tire construction, a filler member therefor, stay members substantially radially disposed, held in predetermined radial location by concentrically positioned ropes or cables, and resilient radially disposed blocks between said stay members.

5. In a tire construction, a filler member therefor, stay members held mounted substantially radially disposed in relation to each other, to approximately the inner contour of the tire, said mounting for disposing said stay members in the position aforementioned including concentrically positioned ropes or cables engaging said stay members.

6. In a tire construction, a filler member therefor, inner and outer stay members mounted in radially spaced relationship from each other, and affixed by concentrically positioned ropes or cables, and resilient blocks between said outer stays and transverse ropes or cables for holding said stays in predetermined radial spaced relationship.

In witness whereof, I have hereunto signed my name this 7th day of July, 1931.

MICHAEL S. SUTTON.